United States Patent
Bölderl-Ermel et al.

(10) Patent No.: US 12,204,305 B2
(45) Date of Patent: Jan. 21, 2025

(54) SYSTEMS AND METHODS FOR DIGITAL AUTHENTICATION OF USAGE DATA OF AN AUTOMATION PLANT

(71) Applicant: Siemens Aktiengesellschaft, Munich (DE)

(72) Inventors: Wolfgang Bölderl-Ermel, Wendelstein (DE); Rene Ermler, Erlangen (DE); Robert Pfont, Ebersberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/022,020

(22) PCT Filed: Aug. 10, 2021

(86) PCT No.: PCT/EP2021/072291
§ 371 (c)(1),
(2) Date: Feb. 17, 2023

(87) PCT Pub. No.: WO2022/037999
PCT Pub. Date: Feb. 24, 2022

(65) Prior Publication Data
US 2023/0244202 A1     Aug. 3, 2023

(30) Foreign Application Priority Data
Aug. 19, 2020   (EP) ................................ 20191778

(51) Int. Cl.
*G05B 19/042*   (2006.01)
*G05B 19/418*   (2006.01)

(52) U.S. Cl.
CPC ..... *G05B 19/0428* (2013.01); *G05B 19/4186* (2013.01); *G05B 2219/25157* (2013.01); *G05B 2219/36542* (2013.01)

(58) Field of Classification Search
CPC ............ G05B 19/0428; G05B 19/4186; G05B 2219/25157; G05B 2219/36542
See application file for complete search history.

(56) References Cited

U.S. PATENT DOCUMENTS 10,873,457 B1 * 12/2020  Beaudoin .............. H04L 9/3213
2019/0037012 A1 *  1/2019  Stöcker ................. H04L 67/104
(Continued)

FOREIGN PATENT DOCUMENTS

EP          3 671 599 A1    6/2020

OTHER PUBLICATIONS

PCT International Search Report and Written Opinion of International Searching Authority mailed Mar. 12, 2021 corresponding to PCT International Application No. PCT/EP2021/072291 filed Oct. 8, 2021.

*Primary Examiner* — Charles R Kasenge
(74) *Attorney, Agent, or Firm* — Henry M. Felereisen LLC

(57) ABSTRACT

A system includes a first module configured to collect automation plant-related data that include at least operating data, and to generate based on the operating data manipulation-proof usage data which are then transmitted to a second module configured to determine at least a part of the manipulation-proof usage data, to form a checksum from the at least one part of the manipulation-proof usage data, to transfer the checksum to at least one node of a distributed ledger network, and to store the manipulation-proof usage data in an area outside the distributed ledger network. A third module participates in the distributed ledger network and is configured to obtain the manipulation-proof usage data from the area and to check the correctness of the manipulation-proof usage data by forming a checksum.

25 Claims, 4 Drawing Sheets

(56) References Cited

U.S. PATENT DOCUMENTS

| | | |
|---|---|---|
| 2019/0288847 A1 | 9/2019 | Beckmann et al. |
| 2019/0340269 A1* | 11/2019 | Biernat .................... H04L 9/50 |
| 2019/0384839 A1* | 12/2019 | Esposito, II ........ G06F 16/2379 |
| 2020/0225649 A1* | 7/2020 | Cahill ................ G05B 19/4183 |
| 2020/0228316 A1 | 7/2020 | Cahill |
| 2020/0228342 A1* | 7/2020 | Nixon .................. H04L 9/0637 |
| 2022/0067727 A1 | 3/2022 | Dichtl |

\* cited by examiner

SYSTEMS AND METHODS FOR DIGITAL AUTHENTICATION OF USAGE DATA OF AN AUTOMATION PLANT

CROSS-REFERENCES TO RELATED APPLICATIONS

This application is the U.S. National Stage of International Application No. PCT/EP20201/072291, filed Aug. 10, 2021, which designated the United States and has been published as International Publication No. WO 2022/037999 A1 and which claims the priority of European Patent Application, Serial No. 20/191,778.8, filed August 19, 020, pursuant to 35 U.S.C. 119 (a)-(d).

BACKGROUND OF THE INVENTION

The invention relates to a system for digital authentication of usage data of an automation plant.

The invention further relates to a computer-implemented method for verifying and preferably for digitally authenticating usage data of an automation plant.

With increasing digitization, machines and devices are becoming "smarter" and are able to make performance, operating and usage data available. Already today, this capability is used in order to have a means of control over the production efficiency of machine and factory (for example by means of what is known as condition monitoring).

In the leasing industry sector, a lessor can use the value of a machine (asset) as financial security. If the lessor provides his financial regulator with credible and trusted proof that the machine is operating correctly at the agreed usage location, he can significantly reduce the outlay for preventive maintenance. In order to obtain this proof, the lessor must delegate a trusted employee or a third party whom the lessor can trust so that they can form a picture of the condition of the machine on site. A number of problems occur in this case. If the machine for example cannot be easily and promptly seen, the consequence may be that the machine is devalued as security for the lessor. The condition as stipulated in the contract (the financial security) can only be restored at additional cost. When the lessee returns the machine at the end of the leasing term, the lessor can offer this machine for sale to another user in a secondary market. The other user must be able to rely on the declaration of the seller concerning condition and depreciation, which on the one hand can lead in "untrusted" business relationships to the failure of the transaction. On the other hand, the buyer can be misled by false statements concerning the condition of the machine.

A further payment model relates to a usage-based rental arrangement. In contrast to time-based renting (such as for example in the case of residential rentals), in this case rent is paid for example according to additional shifts, overload situations or performance indicators. In all these cases, the operator of the machine must be able to rely on the unmanipulated machine data determined on site and the user on a settlement of accounts correctly derived therefrom, which task can be fulfilled by an independent assessor or auditor.

Furthermore, machines are certified in order to prove that they operate in compliance with the rules. These rules are used for example by an insurance industry (for example shipping licenses) in order to enable high-quality machines to be assessed more accurately. However, they are also set up by public authorities and in some cases may vary widely from state to state, for example state-specific permits for use of radio frequencies, which furthermore can change at short time intervals with the advent of new technologies. Against this backdrop, it is necessary for the operator of the machine to furnish the public authority with credible and trusted proof of an operation of the machine in compliance with the rules.

The object of the present invention can therefore be seen in providing systems and methods which allow manipulation-proof and trusted storage of the relevant usage data of an automation plant and the verification thereof by a third party.

SUMMARY OF THE INVENTION

The object is achieved according to the invention by means of a system of the type cited in the introduction in that the system comprises a first module, for example an edge device or a controller, in particular a CNC controller, a second module, for example a service for forming checksums, in particular embodied by hash values, and a third module, an assessor or an inspecting authority, in particular an auditing service, wherein the first module is configured to collect automation plant-related data, the automation plant-related data comprising at least operating data, to generate manipulation-proof usage data based on the operating data, and to transmit the manipulation-proof usage data to the second module, wherein the second module is configured to determine at least a part of the manipulation-proof usage data, to form a checksum from the at least one part of the manipulation-proof usage data preferably by means of a cryptographic hash function, to transfer the checksum to at least one node of a distributed ledger network, and to store the manipulation-proof usage data and preferably information about which method was used for forming the checksum in a preferably secure area outside the distributed ledger network, wherein the third module participates in the distributed ledger network and is configured to obtain the manipulation-proof usage data and preferably the information about which method was used to form the checksum from the preferably secure area in response to a request, and to check the correctness of the manipulation-proof usage data on the basis of the checksum. In this case the third module is not necessarily required to have at its disposal (i.e. possess or administer) one or more nodes. Physical access and reading access of the third module to any one of the nodes of the distributed ledger network are sufficient.

The automation plant may be embodied for example as a production or manufacturing plant.

The automation plant-related data may furthermore include performance data, the first module being able to be configured to generate manipulation-proof usage data based on the operating and performance data.

The second module is preferably configured to filter out from the manipulation-proof usage data transmitted to it that data which is relevant for a predefined application. This can be for example data relevant to accounting, certification, insurance, etc.

In addition, the first module can be configured to store the operating data and preferably the performance data securely for example locally to the automation plant (i.e. inside the automation plant).

Furthermore, the first module can additionally be configured to transmit the operating data and preferably the performance data to the second module, the second module being able to be additionally configured to process the operating data and preferably the performance data accordingly, for example to form a checksum, for example a hash value, from at least a part of the operating data and preferably the performance data, and to store the processed operating data and preferably performance data in the distributed ledger network. In addition, the second module can store the (unprocessed) operating data and preferably performance data in a preferably secure area outside the distributed ledger network.

The inventive use of the usage data and preferably the operating data and the performance data allows a simple digitization of those processes in which the automation of a plant per se is not a priority and a resource-consuming evaluation of the usage data is not necessary. Processes of this type are mainly processes in which different parties may have different economic interests and include for example processes of the financial and insurance industries but also legal processes, for example when using state-specific (location-dependent) certificates.

Using the distributed ledger network also enables a better scaling in the use of machine data.

Furthermore, the use of the distributed ledger network has the advantage that the third party does not have to be trustworthy. The third party can rely on the correctness of the data present in the distributed ledger network, preferably in the blockchain network, because for technical reasons it cannot be changed in practice subsequently.

What is understood by the term "automation plant-related data" in the context of the present invention is that data which is related to an automation plant. This may include for example performance data, operating data, process data, plant location data, etc.

A distributed ledger network is also referred to as a distributed ledger technology network (DLT network) or a distributed database management system (DBS) based on DLT technology.

The term DBS—distributed database—can generally refer to a decentralized distributed database, a blockchain, a distributed ledger, a distributed memory system, a system (DLTS) based on distributed ledger technology (DLT), a revision-secure database system, a cloud, a cloud service, a blockchain-in-a-cloud, a peer-to-peer database system, etc. In this case, various implementations of a blockchain or a DLTS come into consideration. For example, a blockchain or a DLTS is conceivable which is implemented by means of a directed acyclic graph (DAG), a cryptographic puzzle, a hash graph or by means of a combination comprising at least two of these variants. It is entirely possible to implement different consensus algorithms. For example, a consensus algorithm can be implemented by means of a cryptographic puzzle, a gossip-about-gossip method, a virtual voting method or a combination thereof. If, for example, a blockchain is used, this may be in particular a bitcoin-based implementation or an Ethereum-based implementation. The term "distributed database" may also refer to a DBS in which at least some of its nodes and/or devices and/or infrastructure are implemented by a cloud. For example, the corresponding components are implemented as nodes/devices in the cloud (for example as virtual nodes in a virtual machine).

It is perfectly conceivable to combine the above-described implementation scenarios or only their subsidiary aspects with one another. For example, a hash graph can be used as a blockchain, in which case the blockchain may be a block batch.

In the context of the present invention, a "module" can be implemented by a processor and/or a memory for storing a program code. A module can be implemented in hardware and/or in software and/or in firmware. For example, the processor can be configured to execute the commands/instructions contained in the program code which implement the methods recited herein or steps of the methods described herein. A module may also be embodied as a node of a distributed database system (DBS) which implements or comprises specific functions or features of the corresponding module. The corresponding modules may be implemented for example as discrete/separate/individual modules. The corresponding modules may comprise further elements. These further elements may comprise for example one or more interfaces (for example database interfaces, communication interfaces, such as a network interface or WLAN interface, for example) and/or an evaluation unit (for example a processor) and/or a memory, By means of the interfaces it is possible to exchange data (for example to receive, communicate, transmit, provide, etc.), By means of the evaluation unit it is possible to compare, validate, process, assign, calculate, etc. data in a computer-implemented and/or automated manner. By means of the memory it is possible to store, retrieve, provide, etc. data in a computer-implemented and/or automated manner. It is entirely conceivable for a plurality of modules to be implemented by a standard processor.

A program code—such as a smart contract, for example—may relate to one program instruction (one program command) or to a plurality of program instructions (program commands) which, in connection with the present disclosure, are stored in one or more transactions. The program code can be executable and can be executed by the DBS, for example. This can be implemented for example by means of a runtime environment, for example a virtual machine, the runtime environment or the program code preferably being complete. The program code is preferably executed by the infrastructure of the DBS. For this purpose, a virtual machine can be implemented by means of the infrastructure of the DBS. It is possible to execute the program code during the validation of a corresponding transaction. Smart contracts usually relate only to the handling of the blockchain-relevant workflow (for example bitcoin: checking whether the sender of digital currency actually has access to the account, etc.).

Within the context of the present disclosure, a checksum, for example a data block checksum, a data checksum, a node checksum, a transaction checksum, a concatenation checksum or the like, can relate to a cryptographic checksum or a cryptographic hash or hash value. Such checksums can be determined in particular via a dataset and/or data and/or one or more transactions and/or a subsection of a data block, for example the block header of a block of the blockchain or the data block header of a data block of a DBS or only of a part of the transaction of a data block. A checksum can be implemented specifically by means of a checksum or checksums or a hash value or hash values of a hash tree, for example a Merkle tree, a Patricia tree. Further, a checksum can also be implemented by means of a digital signature or an authentication code for cryptographic messages. With the aid of checksums it is possible to implement a cryptographic protection/tamper protection for example for usage data and for transactions together with the associated data and datasets on different levels of the DBS. For example, if a higher degree of security is required, checksums can be generated and validated at transaction level. If, for example, a lower level of security is required, checksums can be generated and validated at block level—for example via the entire block or only via a part of the data block and/or a part of the transaction.

A smart contract process or a smart contract functionality can refer to the execution of a program code, for example a control command, in a process by means of the DBS or the respective infrastructure.

As explained above, a smart contract can refer to an executable program code. The smart contract is preferably stored in a transaction of the DBS for example a blockchain—for example in a data block of the DBS. For example, the smart contract can be executed in the same way as has been described hereinabove with reference to "program code".

In one embodiment, it can advantageously be provided that the automation plant-related data additionally comprises further data, for example location data, the first module being configured to digitally sign and encrypt the further data and to transmit said digitally signed and encrypted further data to the second module, the second module being configured to transfer at least a further part of the digitally signed and encrypted further data to at least one node of the distributed ledger network, the third module being configured to verify the correctness of the further part of the data.

It can be beneficial if the operating data and preferably the performance data are trustworthy; in particular the operating data and preferably the performance data are acquired by preferably certified sensors arranged on machine tools of the automation plant. In one embodiment, it can be provided for example that the sensors comprise at least one certificate. The certificate can have been issued for example by the certification authority of the machine manufacturer and/or of the manufacturer of the first module. In this case the sensors have a unique ID ex works. This affords the advantage that the measured values captured by the sensors are already trustworthy, Preferably, the operating data and preferably the performance data satisfy a standardized data or machine model. Later, at the time of an authentication or verification of the usage data and preferably the operating data, this enables for example the general parameter name "rotational speed" or "energy consumption" to be uniquely assigned its meaning in a machine without knowing the individual machine topology.

In one embodiment, it can be advantageous if the first module or/and the second module is/are configured to encrypt data.

In one embodiment, it can advantageously be provided that the third module is configured to authenticate the manipulation-proof usage data electronically in the event of a successful verification of the correctness of the manipulation-proof usage data, the electronic authentication preferably including a timestamp.

In one embodiment, it can be provided that the third module is configured to control the automation plant, preferably to control it to an adequate degree, in the event of a failed verification of the correctness of the manipulation-proof usage data. In this case it can be provided that the third module has an interface via which it can access the infrastructure of the automation plant and control the corresponding machines (for example machine tools, production machines, etc.) and/or assets in the plant. It can be provided for example that the third module is configured to shut down the corresponding machine or preferably to prevent any communication with said machine (until further notice).

In one embodiment, it can advantageously be provided that the distributed ledger network is a blockchain network, preferably a private blockchain network.

In one embodiment, it can advantageously be provided that the distributed ledger network comprises at least one smart contract, the second module being configured to communicate with the at least one smart contract, and the third module is configured to perform the verification of the correctness automatically with the aid of the at least one smart contract.

It can be provided in this case that the first module is set up to acquired data from at least one machine of the automation plant, and that the third module is set up and/or configured to influence the behavior of the at least one machine as a function of a result of the verification of the correctness of the manipulation-proof usage data and by means of the at least one smart contract. It can be beneficial in this case if the at least one smart contract has a corresponding interface or interfaces (for example to the automation plant and to the third module). The third module can produce a corresponding change in the at least one smart contract depending on the result of the verification of the correctness of the manipulation-proof usage data. The next time the at least one smart contract is invoked on the part of the at least one machine, the at least one machine can check usage preconditions, for example. If the smart contract is amended by the third module in such a way that one of the preconditions is not met because, for example, the machine is not used in accordance with an operating mode agreed in the smart contract, the machine establishes this the next time the smart contract is invoked and for this reason can refuse the further use on its own initiative.

The object of the invention is also inventively achieved by means of a computer-implemented method cited in the introduction in that automation plant-related data is acquired, wherein the automation plant-related data comprises at least operating data for example of a machine tool or production machine, manipulation-proof, preferably digitally signed usage data is generated based on the operating data, at least a part of the manipulation-proof usage data is determined, a checksum is formed from the at least one part of the manipulation-proof usage data, the checksum is transferred to at least one node of a distributed ledger network, the manipulation-proof usage data is stored in a preferably secure area outside the distributed ledger network, a request is issued to make available the manipulation-proof usage data from the preferably secure area for the purpose of verifying its correctness and preferably Information about which method was used to form the checksum, in response to the request, the manipulation-proof usage data is made available from the preferably secure area for the purpose of verifying its correctness, as well as preferably information about which method was used to form the checksum, the correctness of the manipulation-proof usage data is verified on the basis of the checksum.

It can be expedient in this case if the request is made to an agency which is able to provide the manipulation-proof usage data and preferably the information about which method was used to form the checksum. It can be beneficial in this case if the request is made by a further agency—by an examining body, for example a public authority—which is able to verify the correctness of the manipulation-proof usage data, i.e. can access the checksum. The examining body may be embodied for example as the aforementioned third module.

In one embodiment, it can advantageously be provided that the automation plant-related data comprises further data in addition, for example location data, wherein the further data is digitally signed and encrypted, a further part of the data is chosen from the digitally signed and encrypted further data and transferred to at least one node of the distributed ledger network, the correctness of the further part of the data is verified, preferably by the third party/the examining body.

In one embodiment, it can be advantageous if in the event of a successful verification of the correctness of the data (the manipulation-proof usage data and preferably further data, for example geolocation, etc.), the verified data is electronically authenticated, the electronic authentication preferably including a timestamp. This authentication can be provided in the blockchain by means of a digital notarial service, for example.

In one embodiment, it can advantageously be provided that it is possible to control the automation plant—to an adequate degree, as described above—in the event of a failed verification of the correctness of the manipulation-proof usage data.

In one embodiment, it can be beneficial if the distributed ledger network comprises at least one smart contract, the verification of the correctness of the manipulation-proof usage data and preferably of the further data being performed automatically by means of the at least one smart contract.

The at least one smart contract comprises rules, non-compliance with which leads to a predefined response on the part of the smart contract. For example, the at least one smart contract can enforce or bring about a compulsory shutdown of an installation/a machine if certain maintenance work that is mandatory for insurance cover has not been carried out and indisputable documentation of the facts is present for all parties. Further measures are also conceivable. For example, in the event of non-compliance with ambient conditions such as temperature, humidity, etc., an official warning can be issued and/or the installation/the machine can be excluded at least temporarily from the communications network.

In one embodiment, it can accordingly be advantageously provided that the at least one smart contract is executed as a function of a result of the verification of the data and at least one machine embodied as a node of the distributed ledger network performs an action in response to a result of the execution of the at least one smart contract, for example shuts itself down or blocks the communication with other machines in an automation plant network.

The machine (or a part of the machine or plant) can for example have the at least one smart contract executed or the at least one smart contract can be executed by another agency. The machine can then perform a certain action on the basis of the result of the execution of the smart contract (for example shut itself down or block the communication of another machine).

To sum up, the invention enables the operator of the machine/the automation plant to furnish a third party, for example a public authority, with credible and trustworthy proof of operation of the machine/the automation plant in compliance with the rules.

Furthermore, an automatic provision and evaluation of the usage data (and possibly of further data, for example also the operating data and preferably the performance data) permits new digital financial instruments to be employed cost-effectively in industry and consequently the control of the existing and future financial processes.

Moreover, standards and rules of authorities and regulators can be reliably implemented and documented transparently for all parties. The documentation is credible or trustworthy. The automatic implementation of the government regulations permits products needing such approvals to be deployed globally in industry both quickly and cost-effectively in the future.

BRIEF DESCRIPTION OF THE DRAWING

The invention is described and explained in more detail below with reference to the exemplary embodiments illustrated in the figures, in which.

DETAILED DESCRIPTION OF PREFERRED EMBODIMENTS

Figure 1:
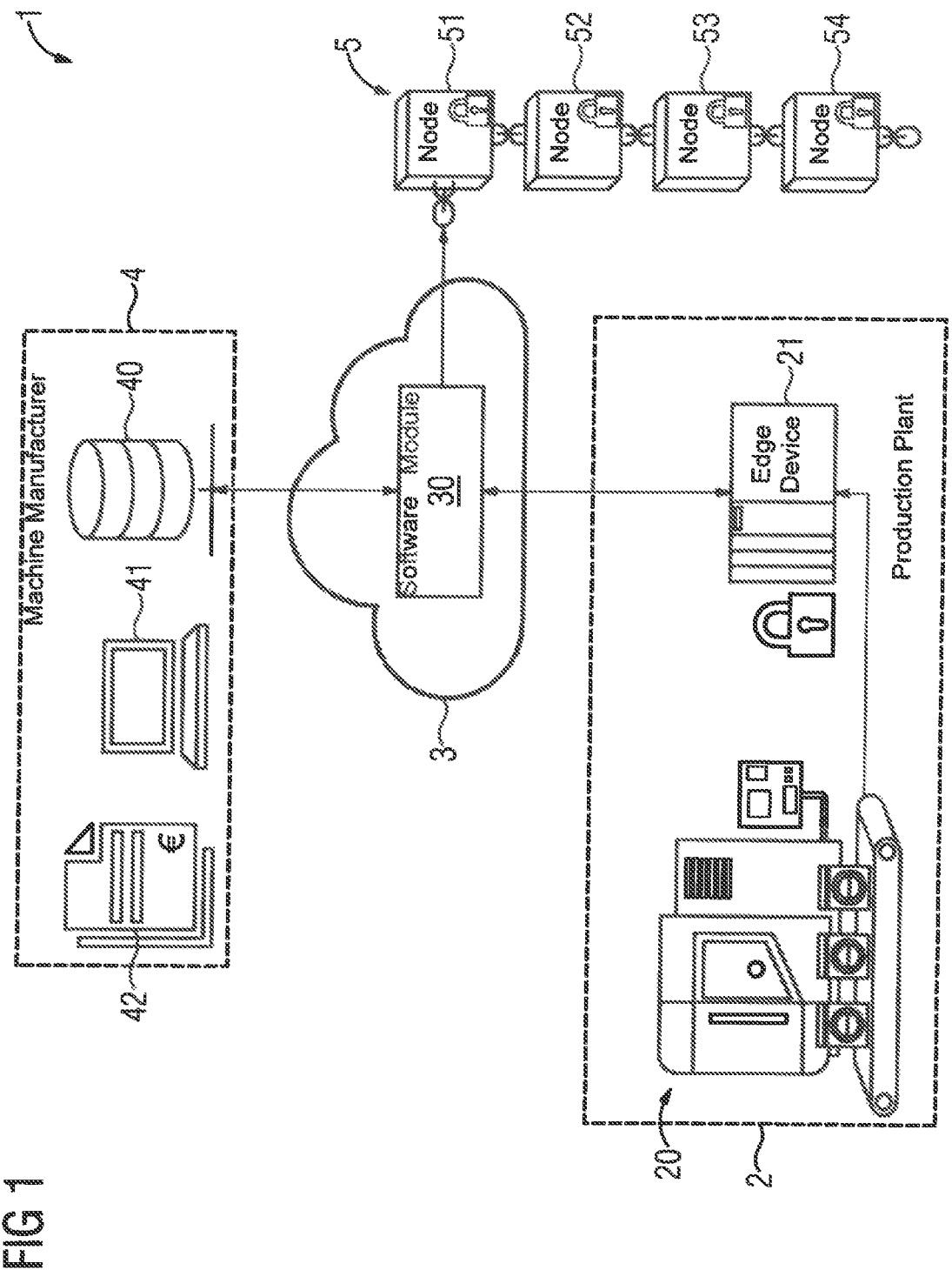
FIG. 1 shows a system for verifying the correctness of the usage data of an automation plant.

FIG. 1 shows a system 1 corresponding to the system according to the invention. For clarity of illustration reasons, one automation plant 2, one cloud system 3, one machine manufacturer 4 or manufacturer of industrial inspection systems and one blockchain network 5 are shown in FIG. 1.

For simplicity of illustration, the automation plant is shown as a production plant 2 comprising a single production machine 20 and a single edge device 21. The edge device 21 has a cloud interface to the cloud system 3. The edge device 21 is an IoT (Internet of Things) device.

The production plant 2 (shop floor) can of course comprise a plurality of edge devices and a plurality of machines. Not infrequently, an automation plant comprises a machine network consisting of dozens or even hundreds of machines and an industrial inspection system comprising multiple (possibly also dozens or hundreds of) edge devices. The machines can be embodied for example as robots, machine tools, manufacturing machines, AGVs (autonomous guided vehicles), etc. The machines can be embodied as IoT devices or comprise such devices.

The edge device 21 is connected via a machine interface to the production machine 21 and/or to sensors attached to the production machine 21 in order to acquire operating data relating to the production machine 21. Furthermore, the edge device 21 is configured to generate usage data on the basis of the operating data. The operating data can comprise for example the number of turned parts per hour, materials, etc. The usage data can comprise for example the number of operating hours, energy consumption, etc.

Figure 2:
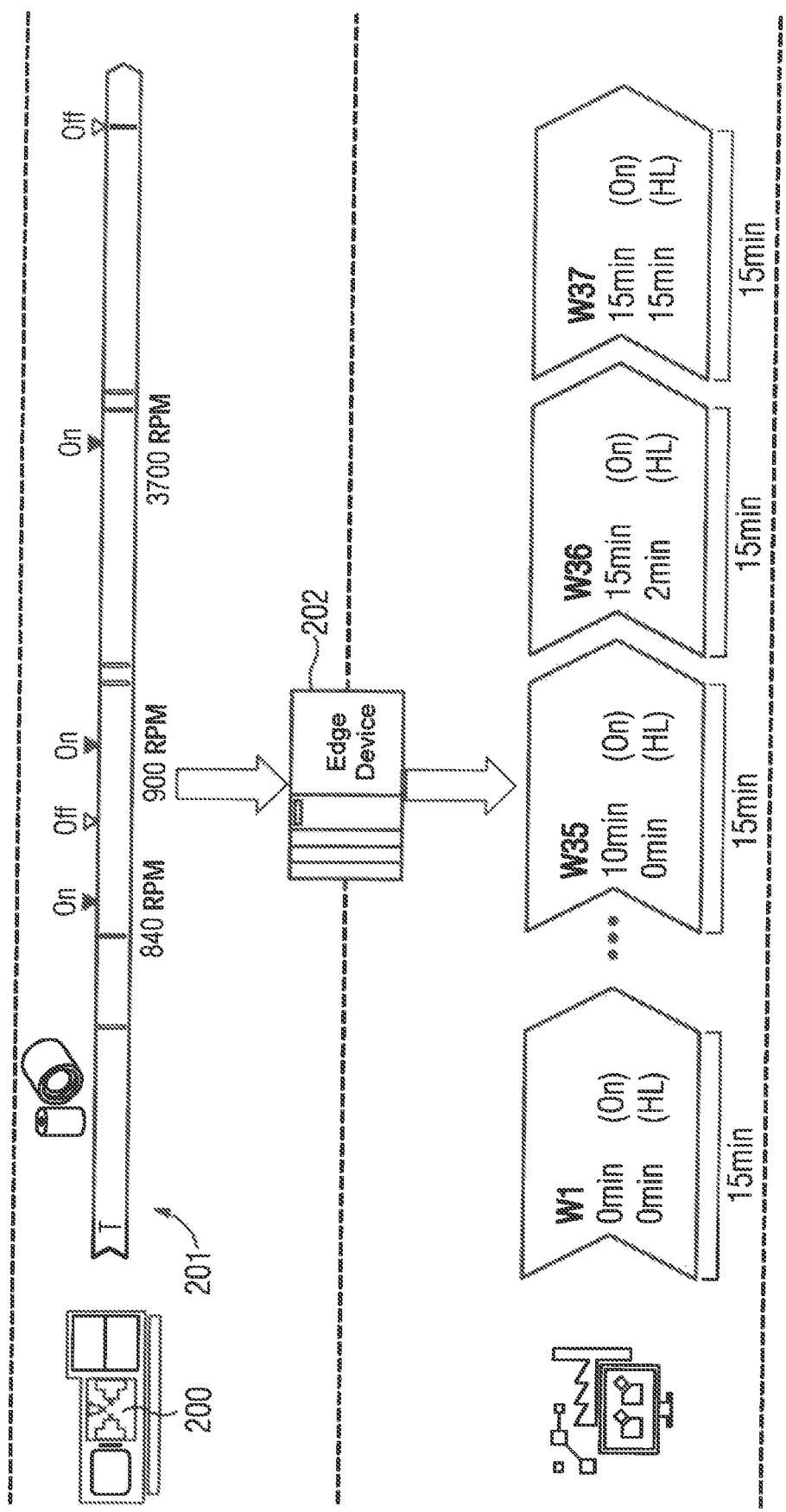
FIG. 2 shows data generated by a milling machine in the form of a time series.

The differences between operating and usage data are now illustrated in FIG. 2 based on the example of a milling machine 200.

FIG. 2 shows operating data generated by the milling machine 200 in the form of a time series 201. In reality, the time series 201 maps by way of example how heavily a spindle of the milling machine 200 is loaded as a function of time T. It can be seen when and at what frequency ("RPM"—revolutions per minute) the spindle is put into operation—"On", and when its operation is terminated—"Off". An edge device 202 assigned to the milling machine 200 and connected to it is configured to acquire the operating data and to generate usage data from the operating data. The usage data can be present for example in the form of a series of time windows W1, . . . W37 of a predetermined length (in this case 15 minutes). Each of the windows W1 to W37 can contain information about how long the spindle was in operation ("On") within said time window and how long the spindle was subject to a predefined heavy load ("HL"). It can be seen from the window W36 for example that the spindle was in operation the whole time (15 min) and of that was subject to the heavy load for 2 minutes. Of course, the length of the windows is not limited to 15 minutes. This length can also vary from window to window. A length of the window of 24 hours is entirely plausible. The load that is considered heavy can likewise be predefined. For example, a load of 3700 RPM can be regarded as heavy.

Moreover, the edge device 21 can be set up to ascertain its location and/or the location of the machine 20. For this purpose, the edge device 21 can have for example a W3C API, in which case the location(s) can be determined by means of GPS, IP, GSM, WLAN, etc.

The edge device 21 can furthermore be set up to acquire KPIs (key performance indicators) and further production-related or -relevant data.

To sum up, the edge device 21 is set up to acquire production plant-related data, wherein the production plant-related data can comprise the usage data and in addition also further data, such as for example the location and/or the KPI and/or machine residual value data, etc. The edge device 21 possesses the capability to digitally sign data and optionally to encrypt said data.

It can also be seen from FIG. 1 that the edge device 21 transmits the production plant-related data via its cloud interface to the cloud system 3. On account of the integrity of the production plant-related data, the edge device 21 is furthermore configured to digitally sign the production plant-related data before it transmits the latter to the cloud system 3. In this case the edge device 21 preferably communicates with a software module 30 which resides in the cloud system 3.

The software module 30 is configured to determine at least a part of the digitally signed usage data and to form a checksum from the part of the digitally signed usage data. Preferably, the software module 30 forms the checksum based on a cryptographic method in order to generate what is termed a cryptographic checksum or a cryptographic hash or a hash value.

Furthermore, the software module 30 can be embodied to determine at least one further part of the further digitally signed production plant-related data and to encrypt said further part.

The part of the digitally signed usage data which the software module 30 determines and from which the software module 30 forms a checksum, preferably a hash value, can for example comprise data relevant to accounting and/or financially relevant data (for example data relevant to the leasing agreement) and/or legally relevant data (for example data relevant to a radio type approval) or consist of said data.

In addition, the software module 30 is set up and/or configured to communicate with at least one node 51 of the blockchain network 5 in order to transfer the checksum, preferably the hash value of the part of the digitally signed usage data, to the at least one node 61. The node 51 then stores the corresponding transaction, which contains for example a timestamp and the checksum, in files and blocks and distributes the files and blocks further to the other nodes 52, 53, 54.

Furthermore, the software module 30 can be set up and/or configured to transfer the encrypted further part of the further digitally signed production plant-related data, for example KPIs and/or the GPS coordinates of the machine 20, to the at least one node 51.

To sum up, the software module 30 is set up to transfer a checksum of a specific part of the digitally signed usage data, for example the part of the usage data relevant to accounting, and optionally further encrypted data, to the at least one node 51. The software module 30 has the capability to encrypt the received data.

In addition, the software module 30 is configured and/or set up to store the digitally signed usage data in a database 40 of the machine and/or edge device manufacturer 4. Other usage data is also stored in the database. It can be advantageous for example to store the GPS data of the machines, the "Heavy Load" factor, which is subsequently well suited for correctly estimating above-average depreciations or defects, etc.

The manufacturer can graphically present usage data on a dashboard 41 and/or generate invoices 42 for the use of the machine 20 in the automation plant 2. It is possible that the machine manufacturer 4 has for example leased the machine 20 to the owner of the automation plant 2.

The blockchain network 5 additionally comprises at least one further node. For simplicity of illustration reasons, three further blockchain nodes 52, 53, 54 are shown in FIG. 1. The blockchain network 5 can, of course, also comprise many more further nodes.

For example, the blockchain network is a private blockchain network 5 or a blockchain network referred to as a consortium blockchain network, in which participation in the blockchain network 5 is restricted to specific participants only. The participants may comprise for example a financial and/or licensing authority. In the industrial environment, for example, private blockchains are used in which the consensus method takes place within a consortium whose members are known to one another, for example, or to an administration authority or fulfill a particular trust level.

However, the blockchain network 5 can also be embodied as a public blockchain network, such as Ethereum for example.

It should be emphasized at this juncture that both the automation plant 2 and the cloud system 3 can belong to the machine manufacturer 4 (the owner of the automation plant 2, the cloud system 3 and the machine manufacturer 4 can be the same juristic or natural person). However, it is also conceivable that the automation plant 2, the cloud system 3 and the machine manufacturer 4 belong to different juristic or natural persons.

Furthermore, the software module 30 can be arranged in the edge device 21 and communicate with the at least one node 51 of the blockchain network 5 via the cloud system 3 or directly. It is also possible that the levels of the machine and/or edge device manufacturer 4 are arranged in their entirety (dashboard 41, invoices 42, database 40) or partially (database 40) in the cloud system 3.

The database 40 is located outside of the blockchain network 5. By this means it can be prevented for example that the blockchain network participants can view the usage data without an access authorization.

Nevertheless, the participants of the blockchain network 5, which for example comprise one or more of the further nodes, can access the checksum of the usage data extract and, if present, the encrypted further data, for example the location data and/or machine residual value data.

Figure 3:
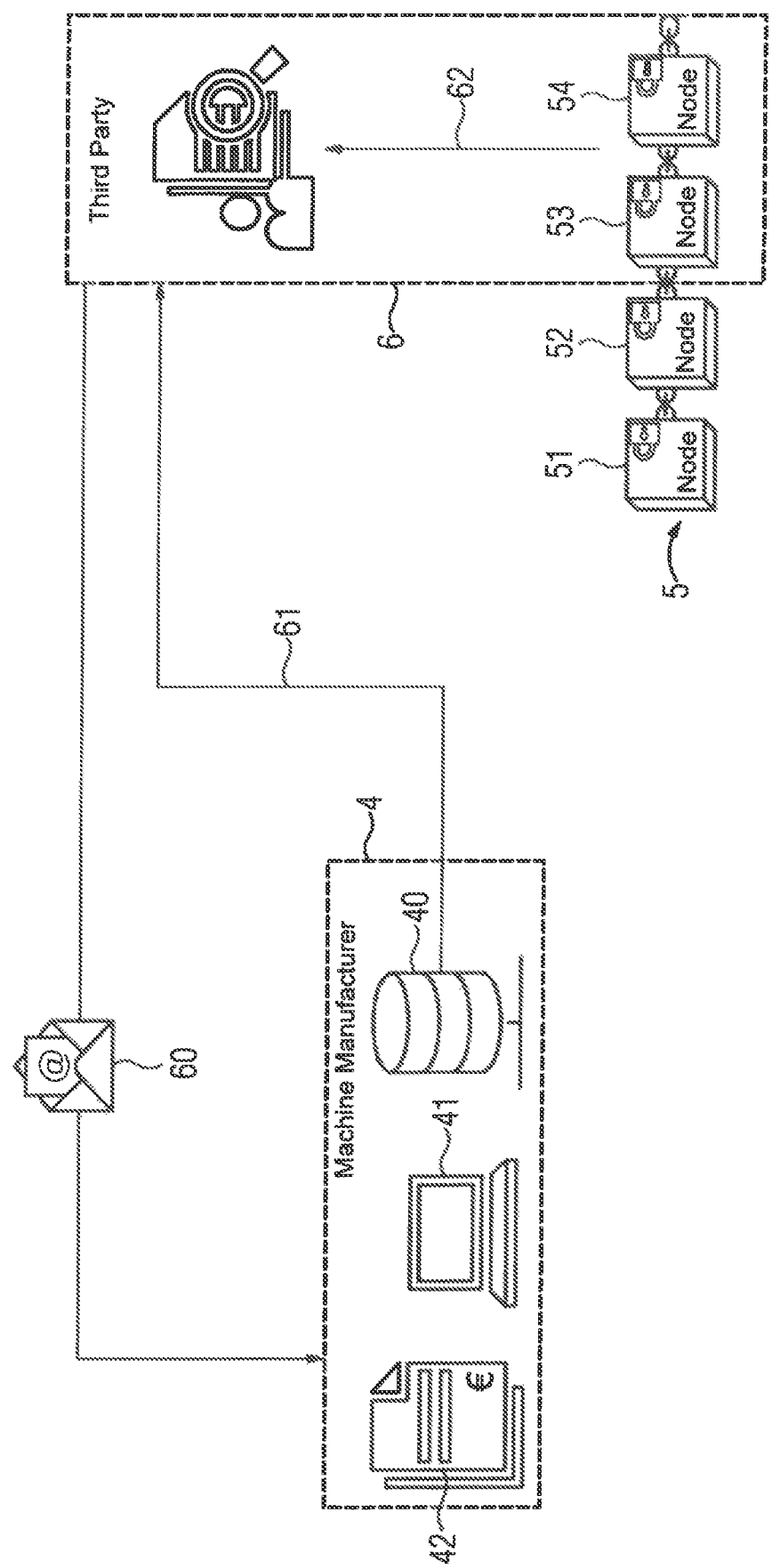
FIG. 3 shows an audit process in which usage data of an automation plant is verified.

An audit process is illustrated in FIG. 3. In the audit process, a check is conducted to verify the correctness of the invoices 42 which the machine manufacturer 4 sends to the owner of the production plant 2 who uses the machine 20 on the shop floor of the plant 20. The check can be carried out for example by a third party 6 on behalf of the owner of the production plant 2, wherein the third party 6 can but does not have to have one or more nodes—in the present case the nodes 53, 54—of the blockchain network 5. The third party 6 can have for example only a physical access and reading access to any of the nodes 51, 52, 53, 54.

First, the third party 6 applies to the machine manufacturer 40 for example by means of a message 60 for that usage data which is to be checked and for which the invoices are available. In addition, the auditor 6 can, if necessary, request a characterization of the method with which the checksum, in particular the hash value, was formed which has been transferred to the at least one node 51 of the blockchain network 5. After the request of the auditor 6 has been fulfilled, the latter can form a checksum, preferably a hash value, from the provided usage data 61 and compare it with the checksum or hash value stored in the blockchain network 5.

The aforesaid also applies analogously to the checking of the encrypted data that may be present in the node 51. In this case the auditor 6 also receives a key from the machine manufacturer for decrypting the encrypted data transferred to the node 51.

Figure 4:
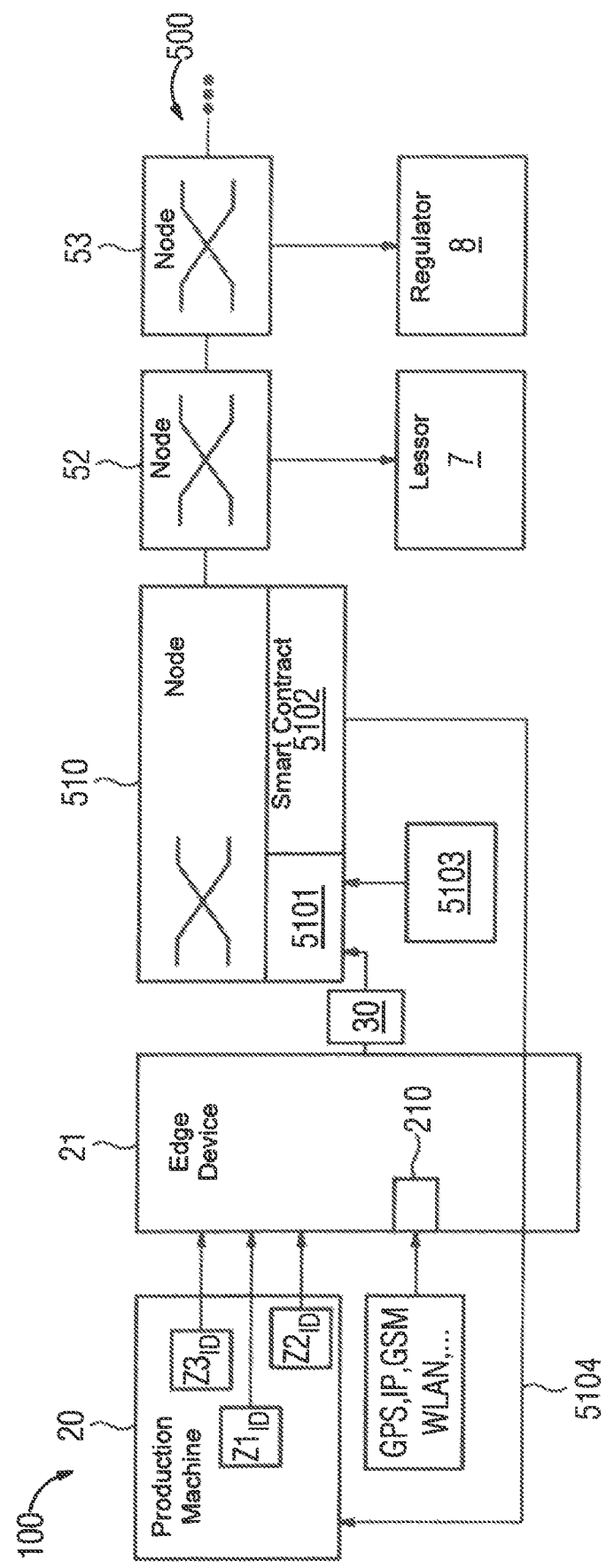
FIG. 4 shows a system for monitoring an automation plant by means of a smart contract.

FIG. 4 shows a system 100, which can be embodied for example as an extension of the system 1 of FIGS. 1 and 3. FIG. 4 shows the machine 20, which has for example three sensors Z1, Z2, Z3. The data from the sensors Z1, Z2, Z3 is acquired by the edge device 21, the edge device 21 further being able to transform, digitally sign and optionally encrypt the acquired data. As already mentioned, the edge device 21 can additionally ascertain the geolocation of the operation site for example by means of a W3C Geolocation API 210. The W3C Geolocation API can determine a correspondingly accurate geographical location using GPS, GSM, WLAN, or an IP address.

The sensors Z1, Z2, Z3 are preferably certified so that the measured value is already trustworthy and possess in particular a unique identification ID ex works, which determine operating data on site on the machine 20 or process (not shown). This operating data preferably satisfies a standardized data or machine model. Later, at the time of an assessment or verification of the operating data, this enables for example the general parameter name "rotational speed" or "energy consumption" to be uniquely assigned its meaning in a machine without knowing the individual machine topology.

In addition to the blockchain network 5 of FIGS. 1 and 3, the blockchain network 500 of FIG. 4 comprises at least one smart contract 5101, 5102. Conditions under which a use of the machine 20 is possible can be mapped in the smart contract. For example, usage conditions, such as for example pay-per-use conditions, can be regulated in this case. Accordingly, the at least one smart contract 5101, 5102 (executable on the blockchain network 500) can govern the relationship between the parties of the system 100, for example between the machine manufacturer 4 and the owner of the production plant 2.

The smart contracts 5101, 5102 can be generated and stored in the node 510 to which the software module 30 transfers the checksum or the hash value and the optionally encrypted further data. However, it is also conceivable that another random node executes the smart contract(s) 5101, 5102 since any node is equally entitled to access all the blocks. In this case the software module 30 can communicate with the smart contract(s) 5101, 5102. In the process, the data transferred by the software module 30 can be supplemented by means of the at least one smart contract 5101, 5102 by an officially certified and current time/date 5103, for example from the time server of the PTB (Physikalisch-Technischen Bundesanstalt—the national metrology institute in Germany).

For example, the edge device 21 can acquire the ID or the software version, operating data and location of the sensors Z1, Z2, Z3 and evaluate these against the criteria "ready for service" or "out of service". The result can be digitally signed, encrypted, for example by means of the edge device 21, and entered into the blockchain network 500 by means of the software module 30.

The edge device 21 can therefore communicate with the at least one smart contract 5101, 5102 in the blockchain 5 by way of the second module 30 (the service generating hash values).

A lessor 7 can now evaluate the data encrypted for him/her in his/her node 52 by means of the at least one smart contract 5101, 5102 and be assured at which time, at which location and in which condition the machine 20 was. Advantageously, the lessor can digitally link the evaluation to his/her financial processes in order to make use of a completely digital execution.

Furthermore, this evaluation can be credibly verified to a regulator 8, even years later, with reference to data which is also accessible to the regulator 8 in the latter's node 53.

If, for example, the edge device 21 digitally signs and encrypts only the ID/software version and the location and transmits these to the software module 30, which enters this data into the blockchain network 500, the at least one smart contract 5101, 5102 can automatically and preferably continuously check all the entered datasets by means of a comparison with the oracle of the machine vendor 4 ("this SW version is in compliance with the rules at this time in this country") and prevent the use of a non-compliant machine by means of a corresponding feedback to the edge device 21.

Advantageously, this can be credibly verified to an authority 8, even years later, with reference to data which is also accessible to the authority 8 in its node 53.

In addition or alternatively, the edge device 21 can digitally sign its ID/software version and a location at which it is installed and enter it preferably in encrypted into the blockchain 5 by way of the second module 30.

The at least one smart contract 5101, 5102 can continuously and automatically check all the entered datasets by means of a comparison with the oracle of the device vendor 4 ("this software version is in compliance with the rules at this time in this country") and prevent the use of a non-compliant device by passing information to the edge device 21. This implementation can be credibly verified to an authority, even years later, with reference to data which is also accessible to the authority in its nodes 53, 53, 54 "authority" 6, 7 or 8 of the blockchain 5.

In addition, the machine 20 itself can also form a node of the blockchain network 500. In this case the at least one smart contract 5101, 5102 can be executed as a function of a result of the check on the data. In response to a result of the execution of the at least one smart contract 5101, 5102, the machine 20, which can communicate with the smart contract(s), can perform a corresponding action, for example shut itself down or block the communication with other machines in an automation plant network (arrow 5104 in FIG. 4). The result of the execution of the smart contract(s) 5101, 5102 is dependent on whether the rules specified there are observed or not. This can but does not have to be accomplished with the aid of the edge device 21.

It is advantageous in this case that the mass data of the industrial process (the operating data) can remain on site at the plant 2. Only that data is transferred into the distributed ledger network 5, for example into the blockchain, which is directly relevant for rapid evaluation by a regulator or authority 6, 7, 8 (for example "device is compliant") or which helps in the event of a dispute to prove the correctness of historical usage data and preferably the operating data (for example weekly hash on the usage data and preferably the operating data stored on site).

Although the invention has been illustrated and described in greater detail on the basis of exemplary embodiments, the invention is not limited by the disclosed examples. Variations hereon can be derived by the person skilled in the art without leaving the scope of protection of the invention as defined by the following claims. In particular, the features described in connection with the method can also find application in the system or complete the latter, and vice versa.

What is claimed is:

1. A system, comprising:
    a first module comprising an edge device connected to a production machine, wherein the first module is configured to acquire automation plant-related data comprising operating data related to the production machine embodied as a time series, and to generate from the operating data manipulation-proof usage data related to the production machine in form of a series of time windows having a predetermined length;
    a second module configured to receive from the first module the manipulation-proof usage data and determine therefrom at least a part of the manipulation-proof usage data, to form a checksum from the at least one part of the manipulation-proof usage data, to transfer the checksum to at least one node of a distributed ledger network, and to store the manipulation-proof usage data in an area outside the distributed ledger network; and
    a third module participating in the distributed ledger network and configured to receive upon request the manipulation-proof usage data from the area outside the distributed ledger network, and to check the manipulation-proof usage data for correctness based on the checksum,
    wherein the distributed ledger network comprises a smart contract, wherein the second module is configured to communicate with the smart contract, and wherein the third module is configured to verify the correctness automatically based on the smart contract, and
    wherein the first module is configured to acquire data from a machine of an automation plant, and wherein the third module is configured to shut the machine down or exclude the machine from a communication in an automation plant network, as a function of a result of the verification of the correctness of the manipulation-proof usage data and by using the smart contract.

2. The system of claim 1, wherein the automation plant-related data additionally comprise further data, wherein the first module is configured to digitally sign and encrypt the further data and to transmit the digitally signed and encrypted further data to the second module, wherein the second module is configured to transfer at least a further part of the digitally signed and encrypted further data to at least one node of the distributed ledger network, and wherein the third module is configured to check the further part of the data for correctness.

3. The system of claim 2, wherein the further data comprises location data.

4. The system of claim 1, wherein the operating data are trustworthy.

5. The system of claim 4, wherein the operating data are acquired by sensors arranged on a machine tool of an automation plant.

6. The system of claim 1, wherein the first module or the second module, or both, are configured to encrypt data.

7. The system of claim 1, wherein the third module is configured to authenticate the manipulation-proof usage data electronically when the correctness of the manipulation-proof usage data is successfully verified.

8. The system of claim 1, wherein the third module is configured to control an automation plant, when the correctness of the manipulation-proof usage data is not successfully verified.

9. The system of claim 1, wherein the distributed ledger network is a blockchain network.

10. The system of claim 1, wherein the first module is configured to acquire data from a machine of an automation plant, and wherein the third module is configured to influence a behavior of the machine as a function of a result of the verification of the correctness of the manipulation-proof usage data and by using the smart contract.

11. The system of claim 1, wherein the automation plant-related data comprises performance data, wherein the first module is configured to generate manipulation-proof usage data based on the operating data and the performance data.

12. The system of claim 11, wherein the first module is configured to store the operating data and the performance data securely within an automation plant.

13. The system of claim 1, wherein the third module is configured to authenticate the manipulation-proof usage data electronically with a timestamp when the correctness of the manipulation-proof usage data is successfully verified.

14. The system of claim 1, wherein the distributed ledger network is a private blockchain network.

15. A method for checking usage data of an automation plant, said method comprising:
    acquiring with a first module, wherein the first module comprises an edge device connected to a production machine, automation plant-related data which comprise operating data related to the production machine embodied as a time series;
    generating with the first module from the operating data manipulation-proof usage data related to the production machine in form of a series of time windows having a predetermined length;
    determining with a second module at least a part of the manipulation-proof usage data;
    forming with the second module a checksum from the at least one part of the manipulation-proof usage data;
    transferring the checksum with the second module to at least one node of a distributed ledger network;
    storing with the second module the manipulation-proof usage data in an area outside the distributed ledger network;
    issuing with a third module participating in the distributed ledger network a request to make available and verifying correctness of the manipulation-proof usage data from the area;
    in response to the request, making the manipulation-proof usage data available to the third module from the area for verifying its correctness;

verifying with the third module the correctness of the manipulation-proof usage data based on the checksum;
verifying the correctness of the manipulation-proof usage data automatically by a smart contract in the distributed ledger network;
executing the smart contract as a function of a result of the verification of the data; and
performing on a machine embodied as a node of the distributed ledger network an action in response to a result of the execution of the smart contract, wherein the action is shutting the machine down or blocking communication between the machine and other machines in an automation plant network.

16. The method of claim 15, wherein the automation plant-related data additionally comprises further data and further comprising digitally signing and encrypting the further data;
selecting from the digitally signed and encrypted further data a further part of the data and transferring the further part to at least one node of the distributed ledger network; and
checking the correctness of the further part of the data.

17. The method of claim 16, wherein the further data comprises location data.

18. The method of claim 16, further comprising electronically authenticating the manipulation-proof usage data and the further data by applying a timestamp, when the correctness of the manipulation-proof usage data and of the further data are successfully verified.

19. The method of claim 16, further comprising verifying the correctness of the manipulation-proof usage data and of the further data automatically by a smart contract in the distributed ledger network.

20. The method of claim 15, further comprising electronically authenticating the manipulation-proof usage data by applying a timestamp, when the correctness of the manipulation-proof usage data are successfully verified.

21. The method of claim 15, wherein the automation plant is controlled when verification of the correctness of the manipulation-proof usage data has failed.

22. The method of claim 15, further comprising:
executing the smart contract as a function of a result of the verification of the data; and
performing on a machine embodied as a node of the distributed ledger network an action in response to a result of the execution of the smart contract.

23. The method of claim 15, wherein the usage data is digitally signed and the area is a secure area and the request provides information about which method was used to form the checksum.

24. A system, comprising:
a first module comprising an edge device or a controller, the first module configured to acquire automation plant-related data comprising operating data embodied as a time series, and to generate from the operating data manipulation-proof usage data in form of a series of time windows having a predetermined length;
a second module configured to receive from the first module the manipulation-proof usage data and determine therefrom at least a part of the manipulation-proof usage data, to form a checksum from the at least one part of the manipulation-proof usage data, to transfer the checksum to at least one node of a distributed ledger network, and to store the manipulation-proof usage data in an area outside the distributed ledger network; and
a third module participating in the distributed ledger network and configured to receive upon request the manipulation-proof usage data from the area outside the distributed ledger network, and to check the manipulation-proof usage data for correctness based on the checksum,
wherein the distributed ledger network comprises a smart contract, wherein the second module is configured to communicate with the smart contract, and wherein the third module is configured to verify the correctness automatically based on the smart contract, and
wherein the first module is configured to acquire data from a machine of an automation plant, and wherein the third module is configured to shut the machine down or exclude the machine from a communication in an automation plant network, as a function of a result of the verification of the correctness of the manipulation-proof usage data and by using the smart contract.

25. A method for checking usage data of an automation plant, said method comprising:
acquiring with a first module automation plant-related data which comprise operating data embodied as a time series;
generating with the first module from the operating data manipulation-proof usage data in form of a series of time windows having a predetermined length;
determining with a second module at least a part of the manipulation-proof usage data;
forming with the second module a checksum from the at least one part of the manipulation-proof usage data;
transferring the checksum with the second module to at least one node of a distributed ledger network;
storing with the second module the manipulation-proof usage data in an area outside the distributed ledger network;
issuing with a third module participating in the distributed ledger network a request to make available and verifying correctness of the manipulation-proof usage data from the area;
in response to the request, making the manipulation-proof usage data available to the third module from the area for verifying its correctness;
verifying with the third module the correctness of the manipulation-proof usage data based on the checksum;
verifying the correctness of the manipulation-proof usage data automatically by a smart contract in the distributed ledger network;
executing the smart contract as a function of a result of the verification of the data; and
performing on a machine embodied as a node of the distributed ledger network an action in response to a result of the execution of the smart contract, wherein the action is shutting the machine down or blocking communication between the machine and other machines in an automation plant network.

* * * * *